R. SAWYER.
Cultivator.
No. 21,170.
Patented Aug. 10, 1858.
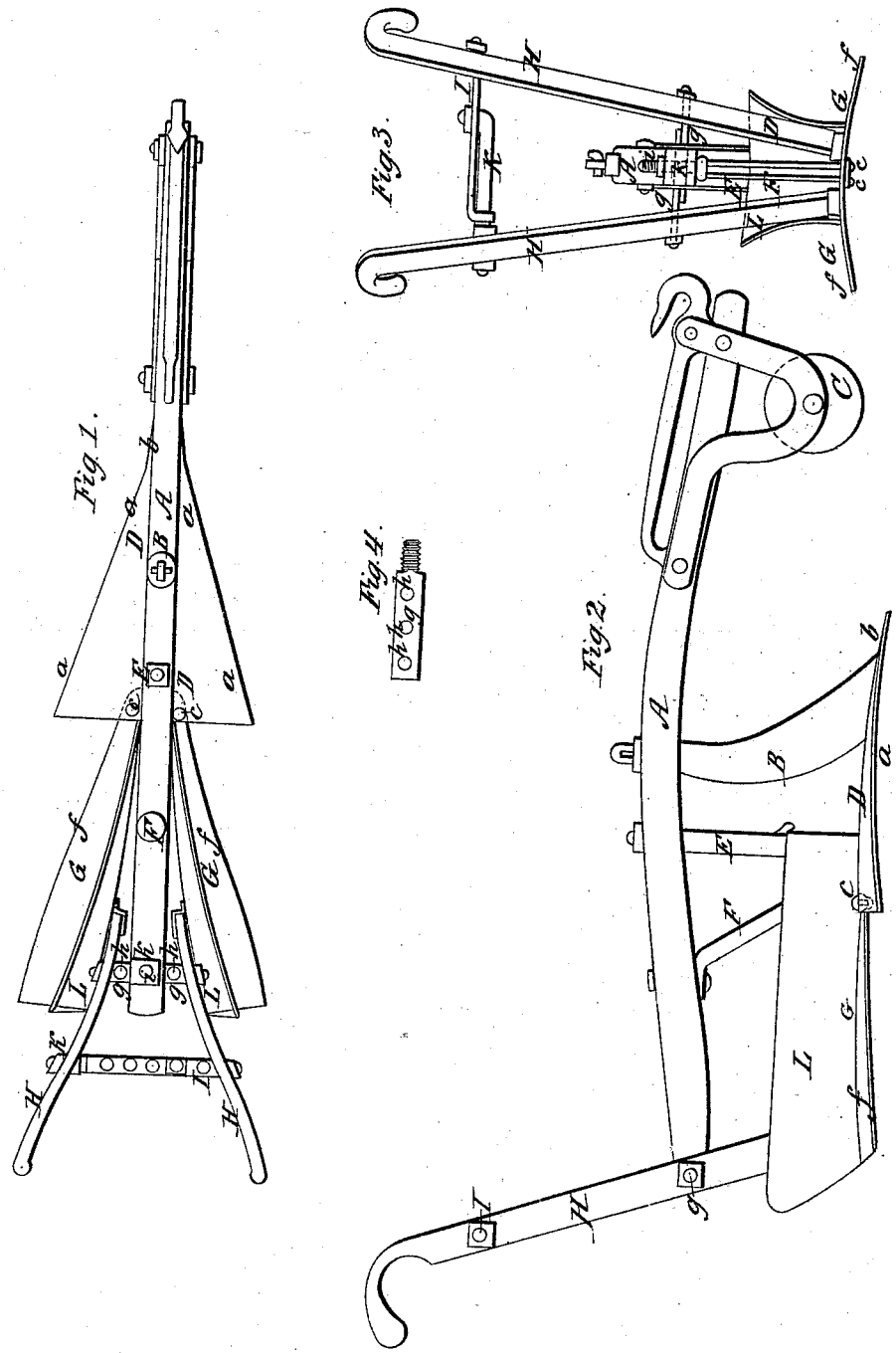

UNITED STATES PATENT OFFICE.

ROBT. SAWYER, OF WALES, ASSIGNOR TO WM. G. BROWN, OF MONMOUTH, MAINE.

IMPROVEMENT IN CULTIVATORS.

Specification forming part of Letters Patent No. 21,170, dated August 10, 1858.

*To all whom it may concern:*

Be it known that I, ROBERT SAWYER, of Wales, in the county of Androscoggin and State of Maine, have invented a new and useful Weeding and Hilling Plow; and I do hereby declare that the same is fully described and represented in the following specification and the accompanying drawings, of which—

Figure 1 is a top view of the said plow; Fig. 2, a side elevation, and Fig. 3 a rear elevation, of it.

In the said drawings, A denotes a plow-beam of the common construction, and furnished with a colter, B, and a gage-wheel, C, applied to it in the ordinary manner. To the lower end of this colter a triangular root-cutter, D, (arranged as shown in the drawings,) is affixed, the same having its two lateral edges, *a a*, sharpened and terminating at their front part in a chisel-shaped nose, *b*. The rear part of this root-cutter has a post or sustaining-rod, E, extending upward from it, nearly vertical, and into the beam A, such post being braced at its foot by a rod, F, arranged as shown in Figs. 2 and 3.

Extending back from the root-cutter D are two other triangular auxiliary knives or cutters, G G, each of which is arranged as shown in the drawings, and made to turn laterally on a pin, *c*, by which it is connected with the cutter D. These rear cutters have their outer edges, *f f*, sharpened, and are respectively attached to the lower end or feet of two plow-handles, H H, which are so connected to the rear end of the plow-beam as to enable them to be adjusted laterally at different distances therefrom. For this purpose each of the said handles has a bar, *g*, extending from it and through a mortise in the plow-beam, and so that one of the said bars shall rest directly upon the other. Each of these bars is furnished with a series of holes, as shown at *h h* in Fig. 4, which is a top view of one of the bars, the holes in each bar being at an equal distance apart, and so that when one hole of one bar is placed directly over any hole of the other bar a screw-pin, *i*, may be inserted through the beam and the two bars and held in place by a screw-nut, *k*, applied as shown in Fig. 3. Furthermore, each handle is furnished with other bars or adjusting devices, constructed and arranged as shown at I K in Figs. 1 and 3, the same being for the purpose of enabling the handles, as well as their cutters G G, to be adjusted and fixed at such distances apart as circumstances may require. Each cutter G is furnished with a turning-share or curved plate, L, which extends upward from it or above it, and is arranged and formed as represented in the drawings. By this method of applying the cutters G G and their shares L L to the plow-beam and the root-cutter D the said cutters G G, with their turning-shares L, may be adjusted so as to bring the rear ends of each cutting-edge of the said cutters G G at such distance apart as it may be desirable for the cutters to operate between any two adjacent rows of corn.

The purpose of the front cutter, D, is to cut under the soil and pulverize it, as well as to exterminate the weeds. In doing this it is assisted by the cutters G G, which, by extending from the middle of the machine a greater distance than does the cutter D, act under the soil which cannot be reached by the cutter D. During this operation the turning-shares turn over the soil toward the corn or plants which may be under cultivation, so as to form hills around the same. Thus my machine is calculated to weed and hill at one and the same time. Should it be desirable, however, to weed the ground for a while without hilling it, the turning-shares may be removed from the cutters, they (the said shares) being restored to place preparatory to performance of the hilling operation.

I do not claim the common cultivator as made with one or more series of small double plowshares applied to adjustable bars or supports connected with a plow-beam; but

What I claim is—

My improved weeding and hilling plow, constructed substantially as described—viz., with a colter, B, a root-cutter D, adjustable cutters G G, and turning-shares L L, applied to adjustable handles, and a plow-beam, and made to operate substantially as specified.

I testimony whereof I have hereunto set my signature this 8th day of August, A. D. 1857.

ROBERT SAWYER.

Witnesses:
F. WORCESTER HAM,
CHAS. J. HAM.